United States Patent [19]
Alther

[11] 4,202,417
[45] May 13, 1980

[54] RAISE DRILL WITH ELASTOMERIC LOAD ABSORBING MEANS

[75] Inventor: George A. Alther, Midland, Tex.

[73] Assignee: Smith International, Inc., Newport Beach, Calif.

[21] Appl. No.: 961,038

[22] Filed: Nov. 16, 1978

Related U.S. Application Data

[63] Continuation of Ser. No. 833,040, Sep. 14, 1977.

[51] Int. Cl.$^2$ .............................................. E21C 23/00
[52] U.S. Cl. .................................... 175/320; 175/53; 175/344; 267/137; 64/27 NM
[58] Field of Search ............... 175/53, 320, 340, 344, 175/374, 375, 409–411; 267/137, 153, 154; 299/90; 64/27 NM

[56] References Cited

U.S. PATENT DOCUMENTS

| | | | |
|---|---|---|---|
| 3,221,619 | 12/1965 | Erickson | 299/41 |
| 3,451,722 | 6/1969 | Scaravilli et al. | 299/90 |
| 3,819,206 | 6/1974 | Aarons et al. | 267/153 |
| 3,866,698 | 2/1975 | Stanley | 175/53 |
| 4,007,799 | 2/1977 | Dixon et al. | 175/320 X |

FOREIGN PATENT DOCUMENTS

2627699 12/1977 Fed. Rep. of Germany ............. 175/53

Primary Examiner—Ernest R. Purser
Assistant Examiner—Nick A. Nichols, Jr.
Attorney, Agent, or Firm—Robert M. Vargo

[57] ABSTRACT

A raise bit is disclosed for enlarging a pilot hole into a larger diameter hole by disintegrating the earth formations surrounding the pilot hole. The raise bit includes a removable drive stem for enabling the raise bit to be transported through small drifts. The drive stem is attached to a thrust bearing plate which, in turn, is interconnected to a main bit body. The bit body extends around the drive stem and includes a plurality of rolling cutters for contacting and disintegrating the earth formations surrounding the pilot hole. The interconnection between the thrust bearing plate and the bit body is accomplished by means of an annular shock absorbing member made of polyurethane. The elastomeric shock absorbing member has a substantially toroidal configuration and is designed and dimensioned to transfer all of the thrust and torsional loads passing from the drive stem and thrust bearing plate to the bit body, while absorbing a large portion of the impact type loads acting on the drill.

4 Claims, 2 Drawing Figures

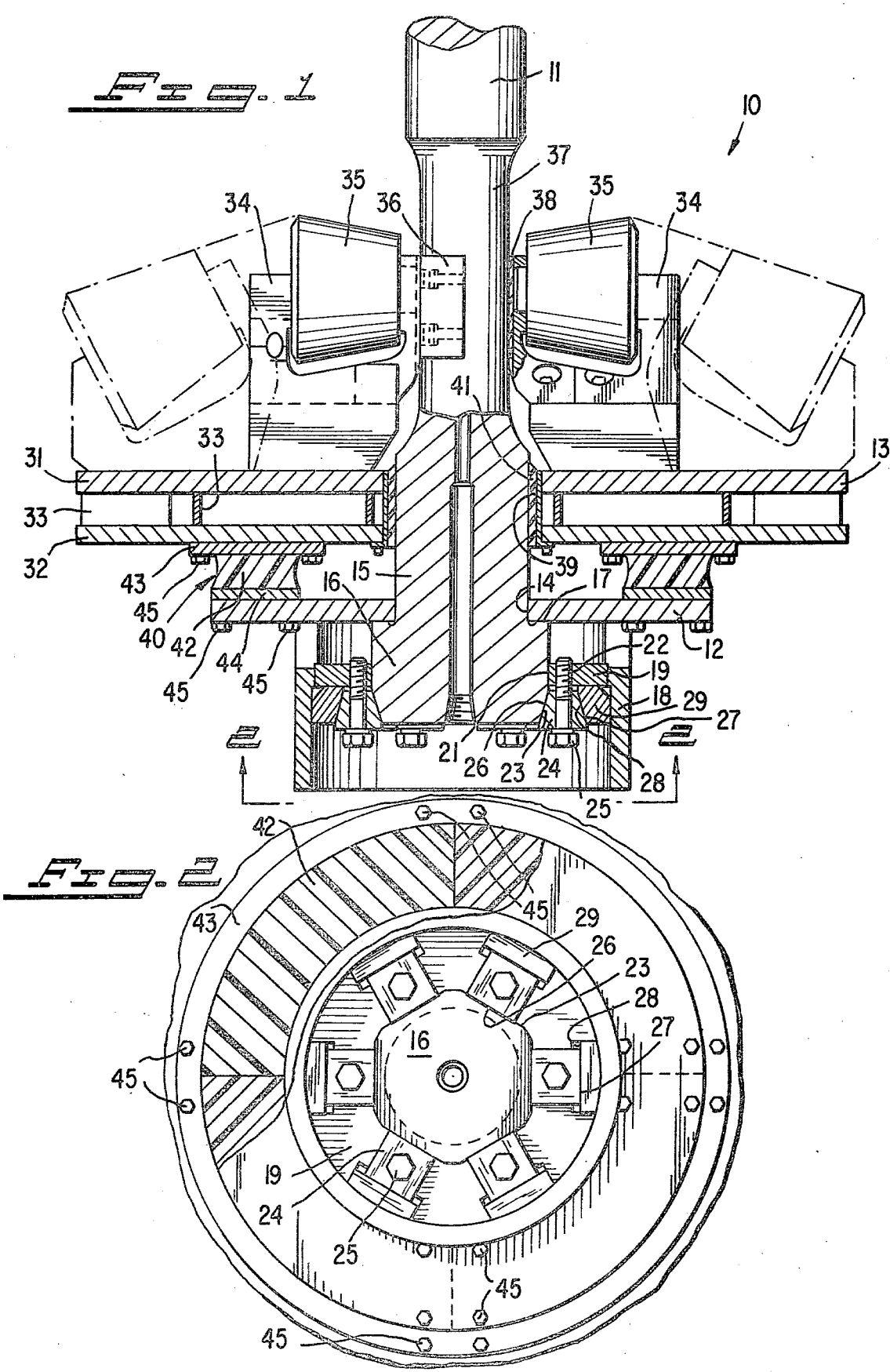

RAISE DRILL WITH ELASTOMERIC LOAD ABSORBING MEANS

This is a continuation of application Ser. No. 833,040, filed Sept. 14, 1977.

BACKGROUND OF THE INVENTION

1. Field of the Invention

The present invention relates generally to raise-type earth boring drills and, more particularly, to such raise drills having shock elements for absorbing bending loads passing through the drill.

2. Description of the Prior Art

A relatively large diameter hole may be provided between two locations in a mine by an operation commonly referred to as raise drilling. A raise drilling operation begins by drilling a small diameter pilot hole through the earth between the locations using a small diameter pilot bit. After the pilot hole is completed, the pilot bit is removed from the drill column and a large diameter raise bit is attached. The raise bit is then rotated and drawn along the pilot hole to enable the drill cutters to contact and disintegrate the earth formations surrounding the pilot hole, thereby enlarging the pilot hole to the desired size. In an exemplary embodiment, the pilot hole may be 11 inches in diameter and the reamed out hole may be six feet in diameter.

During a raise drilling operation, a tremendous amount of wear and stress is imposed upon the raise bit. The drive stem in particular is subjected to considerable wear due to abrasive contact with the surrounding earth formation and is also subject to considerable stress resulting from (a) tension due to the pulling force imparted to the drill, (b) twisting due to the torque applied to the drill, and (c) bending due to uneven loading around the circumference of the drill.

The advantages of having the drive stem removable are that the elements having a relatively short lifespan can be replaced, thereby extending the useful life of the bit, and the low profile of the separated components allows the raise bit to be transported through small drifts or passages.

The disadvantage of the replaceable drive stem is that a certain amount of down time is still required to remove and replace the stem. This non-operating time is costly and it is still preferable to obtain as long a running time as possible for each bit-stem combination.

One area that has not been sufficiently explored in raise drilling is the area relating to improving the operating life of a raise drill drive stem. The present invention accomplished this by providing a shock element in the drill for absorbing the uneven bending and impact type loads on the bit in order to prevent them from being transferred to the drive stem.

Various shock absorbers have been utilized in drill strings or columns; however, none have ever been incorporated on the drill bit body itself for accomplishing bending and impact load absorption.

SUMMARY OF THE INVENTION

In its broadest aspect, the present invention pertains to a raise-type drill comprising a drive stem attached to a thrust bearing support plate which, in turn, is interconnected to a main bit body having a plurality of rolling cutters mounted thereon. The interconnection is accomplished on an elastomeric shock element which functions to transfer the thrust and torsional loads from the drive stem to the bit body while absorbing the bending loads passing therethrough.

The advantage of the present invention is that not only can the operating life of the drive stem be improved, but the shock element can be utilized in a raise drill having a replaceable stem to take advantage of those capabilities also.

Another advantage of the present invention is that the shock absorbing means increases the operating life of the cutter teeth and cutter bearings.

Still another advantage of the present invention is that the rate of penetration of the drill can be vastly improved because more weight and thrust can be applied to the drill than heretofore possible.

Besides decreasing the incidence of stem failure, another advantage of the present invention is that there is less wear and tear on the entire drill.

The features of the present invention, which are believed to be novel, are set forth with particularity in the appended claims. The present invention, both as to its organization and manner of operation, together with the further advantages thereof, may best be understood by reference to the following description taken in connection with the accompanying drawings.

BRIEF DESCRIPTION OF THE DRAWINGS

FIG. 1 is an elevational view, partially in section, of a raise drill utilizing the elastomeric element of the present invention; and FIG. 2 is a fragmentary bottom view of the raise drill taken along lines 2—2 of FIG. 1, with the view partially broken away to show the elastomeric element.

DESCRIPTION OF THE PREFERRED EMBODIMENT

Referring now to the drawings, FIGS. 1 and 2 illustrate a raise drill generally indicated by arrow 10, comprising a drive stem 11, a thrust plate 12, and a bit body 13. The upper end of the drive stem 11 is provided with a tapered thread (not shown) which is adapted to be threaded into a standard drill string through which the raise drill 10 is driven.

The thrust plate 12 has a central opening 14 which has a diameter only slightly larger than the central shank portion 15 of the drive stem 11. The central shank portion 15 is of a smaller diameter than the lower end 16 of the drive stem 11, forming an upwardly facing peripheral shoulder 17, against which the margin of the hole 14 in the thrust plate 12 fits when the thrust plate 12 is in the assembled position with the driven stem 11.

The drive stem 11 is removably attached to the drill assembly by means of the following assembly. The attaching assembly includes a cylindrical collar 18 which extends below the thrust plate 12 and is attached thereto. An annular plate 19 is located inside the collar 18 and is attached to the interior walls thereof. The annular plate 19 includes a central opening 21 which extends about the lower shank portion 16 of the drive stem 11. The annular plate 19 further includes a plurality of threaded bores 22 circumferentially positioned about the central opening 21. The lower shank portion 16 further includes a plurality of tapered flat surfaces 23 located about the periphery of the bottom end thereof.

A plurality of wedge blocks 24 are provided with each wedge block 24 having a bore extending therethrough for receiving a threaded bolt 25. The bolts 25 are adapted to be attached to the threaded bores 22 located on the annular plate 19. Each wedge block 24 further includes a first inwardly facing tapered surface 26 for engagement with the respective flat surface 23 of the drive stem 11. Each wedge block 24 further includes a second outwardly facing tapered surface 27, diametrically opposed to the first tapered surface 26. The second tapered surface 27 is adapted to engage a tapered surface 28 of a registering block 29 which is positioned within the collar 18 adjacent a respective wedge block 24. The blocks 29 are integrally attached to the collar 18.

The bit body 13 is comprised mainly of a pair of parallel plates 31 and 32 rigidly secured to each other by a plurality of ribs 33 to form a frame. The upper plate 31 has a plurality of saddles 34 integrally mounted thereon for rotatively supporting a plurality of rolling cutters 35. The two innermost cutters 35 are interconnected by means of a yoke connection 36 which extends around the central shaft portion 37. A flexible packing 38 is located between the yoke connection 36 and the central shaft portion 37.

The bit body 13 further includes a central opening 39 which extends around the central shaft portion 15 of the drive stem 11. An annular packing member 41 is located between the central opening 39 and the central shaft portion 15.

The thrust plate 12 and the bit body 13 are interconnected by means of an elastomeric element generally indicated by arrow 40. The elastomeric element 40 comprises a substantially toroidal element 42 coaxially positioned with respect to the drive stem 11. The torodial element 42 is made of a polyurethane material which is sandwiched between a pair of plates 43 and 44 which are of a similar toroidal configuration. The toroidal element 42 is of polyurethane material which is bonded to the plates 43 and 44 to form an integral unit. The toroidal configuration of elements 42 and plates 43 and 44 are divided into four equal 90° segments. The plates 43 and 44 include a plurality of threaded bore holes which are adapted to receive a plurality of bolts 45 for connection to the thrust plate 12 and the bit body 13.

OPERATION

The raise drill 10 is utilized in a raise drilling operation to provide a relatively large diameter hole between two levels in a mine. The raise drilling operation begins by drilling a small diameter pilot hole through the earth from a first location to an opening at a second location, using a small diameter pilot bit. After the pilot hole is completed, the pilot bit is removed from the drill column and the raise bit 10 is attached to the drill collar. The raise bit 10 is rotated and drawn along the pilot hole to enable the cutters 34 to contact and disintegrate the earth formations surrounding the pilot hole, thereby enlarging the pilot hole to the desired size.

The raise bit 10 may be transported through small drifts or passages by removing the drive stem 11 and transporting the drive stem 11 and the raise bit body 13 through the small drifts or passages separately. In removing the drive stem 11, the yoke connection 36 is first removed. Afterwards, the bolts 25 are removed utilizing conventional torque tools. Upon removal of the bolts 25 and wedge blocks 24, the drive stem 11 is lowered through the central openings of the thrust plate 12 and the bit body 13 out of engagement therewith. The separate elements of the raise bit 10 may then be transported separately through the small drifts or passages.

When the raise bit 10 is to be connected to the drill column, the drill stem 11 is inserted through the central openings 14 and 21, respectively, until the shoulder 17 engages the margin of the thrust plate 12 around the central opening 14.

The wedge blocks 24 are then positioned as shown in the drawing and the bolts 25 are then threaded into engagement with the plate 19 to urge the wedge blocks 24 into engagement with the flat tapered surfaces 26 of the drive stem 11 and the tapered surfaces 28 of the blocks 29. The bolts 25 are tightened individually to enable the wedge components to be properly aligned. Upon tightening of the bolts 25 the raise bit is then ready for operation.

In accordance with the present invention, the elastomeric element 40 is interconnected between the thrust plate 12 and the bit body 13 to absorb the bending forces due to the unequal loading around the circumference of the drill. The elastomeric element 40 is also designed to transmit all of the thrust and torsional loads from the drill stem 11 to the raise bit body 13. The vertical thrust from the drill stem 11 is transmitted to the thrust plate 12 by the shoulder connection 17 and then through the elastomeric element 40 to the bit body 13. The torque is transmitted from the drill stem 11 through the connection assembly to the collar 18 and the thrust plate 12 which is integrally connected thereto. The torque is then transmitted through the elastomeric element 40 to the bit body 13.

In connecting the thrust plate 12 to the bit body 13, the segmented elements which consist of the toroidal element 42 and the plate segments 43 and 44 are interconnected thereto by means of the bolts 45. Because the elastomeric element 40 absorbs the bending loads on the bit body 13 during operation, a certain amount of deflection occurs. Because of this tilting deflection a certain amount of clearance is provided between the drive stem 11 and the bit body 13 and the yoke connection 36. Although such a clearance can be opened, it is preferred that packing elements 38 and 41 be provided to prevent drilling fluids from passing through from the top of the bit body 13 into the chamber between the bit body 13 and the thrust plate 12.

It should be noted that various modifications can be made to the assembly while still remaining within the purview of the following claims. For example, the elastomeric shock element can also be utilized in box hole drills and vertical thrust borers. The only difference is that the drive stems act in compression rather than tension. Otherwise, the forces passing through the bit bodies to the drive stems remain the same.

What is claimed is:

1. A raise drill for enlarging the diameter of a pilot hole comprising,
    a drive stem having means at one end thereof for connecting to a drill string,
    a bit body including a base having a plurality of rolling cutters mounted thereon, said base having a central opening for enabling the lower end of the drive stem to extend therethrough,
    flexible elastomeric means interconnected between said drive stem and said bit body for absorbing the impact and dynamic loads therebetween and transferring the vertical thrust and the torque loads from the drive stem to the bit body, and
    a thrust plate connected to the bottom end of said drive stem, and thrust plate being contiguous to said bit body base, and said flexible means being interconnected between said thrust plate and said bit body base, said flexible means comprising an annular element extending around the central opening of said bit body base and the central bore of said thrust plate.

2. the combination of claim 18 wherein said annular element has a substantially toroidal configuration which is coaxially positioned with respect to said drive stem.

3. A raise drill for enlarging the diameter of a pilot hole comprising,
   a drive stem having means at one end thereof for connecting to a drill string,
   a bit body including a base having a plurality of rolling cutters mounted thereon, said base having a central opening for enabling the lower end of the drive stem to extend therethrough, and
   flexible elastomeric means interconnected between said drive stem and said bit body for absorbing the impact and dynamic loads therebetween and transferring the vertical thrust and the torque loads from the drive stem to the bit body, the bottom end of said drive stem including an upwardly facing shoulder and said thrust plate including a central hole of a diameter larger than said drive stem immediately above said shoulder but smaller than said shoulder whereby the thrust plate can fit on the drive stem shoulder for transmitting axial loads therebetween, said flexible means comprising an annular element extending around the central opening of said bit body base and the central bore of said thrust plate.

4. The combination of claim 3 wherein said annular element has a substantially toroidal configuration which is coaxially positioned with respect to said drive stem.

* * * * *